Patented Aug. 23, 1932

1,873,580

UNITED STATES PATENT OFFICE

ANTHONY JAMES HAILWOOD, ARNOLD SHEPHERDSON, AND ALEXANDER STEWART, OF BLACKLEY, MANCHESTER, ENGLAND, ASSIGNORS TO IMPERIAL CHEMICAL INDUSTRIES LIMITED, OF WESTMINSTER, ENGLAND

MANUFACTURE OF EMULSIONS

No Drawing. Application filed September 26, 1929, Serial No. 395,459, and in Great Britain October 2, 1928.

This invention relates to the production of emulsions and consists in an improved method for the manufacture of emulsions of liquid agents in water, applicable to the production of concentrated emulsions which may be diluted freely with water.

It has been proposed to use as emulsifying agents mixtures of glues or gelatinizable gums with salts of organic sulphonic acids. For many purposes, however, concentrated emulsions prepared in this way are totally unsuitable, since they form stiff masses, virtually solid, which can only be diluted with great difficulty. This drawback is particularly evident in the case of emulsified oils for use in spraying seeds, plants, trees, etc. Stable concentrated emulsions are obtainable with the aid of glues and organic sulphonates, but when these are stirred into water preparatory to use as sprays they show little or no tendency to mix with the water and remain for many hours as a separate horny or stringy mass which can only be dissolved with the aid of heat. Such emulsions are thus for all practical purposes useless to the farmer and horticulturist.

We now have discovered that these serious difficulties may be entirely overcome and useful, marketable concentrated emulsions can be produced, which are easily pourable and dissolve immediately when stirred with cold water. We achieve this result according to our invention by incorporating with the emulsion one or more specific agents capable of liquefying the gelatinizable emulsifying agents used. By "gelatinizable emulsifying agents" we mean glues, gelatinizable gums, gelatin and the like. The agents we have found suitable for liquefying these substances are urea, thiourea, alkali metal nitrates, and dextrines. Certain organic sulphonic acids, as has long been known, possess the property of liquefying concentrated glue solutions, but we find that these alone are ineffective for the purpose of liquefying glue emulsions without the addition of one or more of the agents specified.

Any emulsion made with glues or other gelatinizable substances may be incorporated with the liquefying agent, and is then obtained in pourable and readily dilutable form. The liquefying agent is preferably incorporated during the emulsifying process.

We prefer to use in our invention as emulsifying agent a mixture of glue or other gelatinizable substance with an organic sulphonic acid which is a wetting-out agent, and as liquefying agent urea or sodium nitrate, the latter being present in amount less than sufficient to coagulate the emulsions; but our invention is not limited to the use of these materials.

Emulsions, concentrated or dilute, prepared according to our invention find application in the textile industry and particularly for the spraying of seeds, plants and trees. Suitable addenda may be made and suitable oils may be used for emulsification appropriate to the purpose in view.

Our invention is illustrated but not limited by the following examples, in which the parts are by weight.

*Example 1.*—2.5 parts of good bone glue are dissolved in 22 parts of water together with 1¼ parts of the product obtained by the alkylation and sulphonation of the mineral oil fraction as described in British Letters Patent No. 274,611 and 5½ parts of urea. 100 parts of neutral tar oil of b. p. 280°–360° C. are emulsified in this by good stirring in a suitable machine or other emulsifying device.

*Example 2.*—21 parts of alkylated sulphonated oil as used in Example 1 are dissolved in a solution of 60 parts gelatin in 444 parts of water. To the resulting solution are added 60 parts of paraffin wax, and the mixture heated until the wax has melted when it is stirred, the wax rapidly becoming emulsified. 90 parts of urea are now added, and the product allowed to cool, stirring being continued.

The product is a thin cream which may be readily poured, and which dilutes easily with cold water, in contradistinction to the product obtained when the preparation is carried out without the addition of urea, etc. The viscosity of the product may be varied, within limits, by the amount of agent employed.

What we claim and desire to secure by Letters Patent is:—

1. In the manufacture of aqueous emulsions, the process which comprises admixing an emulsifiable substance with a gelatinizable emulsifying agent selected from a class consisting of glue, gelatinizable gums and gelatin, and also adding water and an agent capable of liquefying said gelatinizable agent selected from a class consisting of urea, thiourea, and alkali metal nitrates.

2. The process of claim 1 in which there is also incorporated in said emulsions an organic sulphonic acid capable of acting as a wetting-out agent.

3. The process of claim 1 in which the gelatinizable emulsifying agent is an animal glue.

4. The process of claim 1 in which the liquefying agent is selected from urea and sodium nitrate, the latter occurring in amounts less than sufficient to coagulate the said emulsions.

5. The process of claim 1 in which the emulsifiable substance is selected from paraffin wax and neutral tar oil, and in which there is also incorporated an organic sulphonic acid capable of acting as a wetting-out agent.

6. As new compositions of matter, aqueous emulsions readily dilutable with water without coagulation comprising an emulsifiable substance, a gelatinizable emulsifying agent selected from a class consisting of glue, gelatinizable gums and gelatin, and also an agent capable of liquefying said gelatinizable agent selected from a class comprising urea, thiourea, and alkali metal nitrates.

7. The composition of claim 6 in which there is also incorporated an organic sulphonic acid capable of acting as a wetting-out agent.

8. The composition of claim 6 in which the gelatinizable emulsifying agent is an animal glue.

9. The composition of claim 6 in which the liquefying agent is selected from urea and sodium nitrate, the latter occurring in amounts less than sufficient to coagulate the said emulsions.

10. The composition of claim 6 in which the emulsifying substance is selected from paraffin wax and neutral tar oil and in which there is also incorporated an organic sulphonic acid capable of acting as a wetting-out agent.

11. As a new composition of matter, an aqueous emulsion comprising dispersed neutral tar oil having a boiling point from 280° to 360° C., bone glue, urea and a product produced by the alkylation and sulphonation of a mineral oil fraction.

12. As a new composition of matter, an aqueous emulsion comprising dispersed paraffin wax, gelatin, urea and alkylated sulphonated oil.

13. The process of manufacturing aqueous emulsions by means of gelatinizable emulsifying agents characterized by incorporating in the same emulsion an agent capable of liquefying the gelatinizable substance, said liquefying agent being a urea body.

14. The process of manufacturing aqueous emulsions by means of gelatinizable emulsifying agents characterized by incorporating urea in the said emulsion.

In testimony whereof we affix our signatures.

ANTHONY JAMES HAILWOOD.
ARNOLD SHEPHERDSON.
ALEXANDER STEWART